United States Patent [19]

Loftus et al.

[11] 4,036,513

[45] July 19, 1977

[54] PIPE FITTING

[75] Inventors: Edward J. Loftus, Orange, Calif.;
Gerald F. Hofberger, Peoria, Ariz.

[73] Assignee: Gerald F. Hofberger, Peoria, Ariz.

[21] Appl. No.: 654,095

[22] Filed: Feb. 2, 1976

[51] Int. Cl.² ............................................. F16L 21/06
[52] U.S. Cl. .................................. 285/179; 285/236;
285/373
[58] Field of Search ............... 285/236, 235, 179, 423,
285/373, 419, 369

[56] References Cited

U.S. PATENT DOCUMENTS

| 561,442 | 6/1896 | Schmidt | 285/236 |
|---|---|---|---|
| 3,211,475 | 10/1965 | Freed et al. | 285/236 X |
| 3,233,922 | 2/1966 | Evans | 285/236 |
| 3,378,282 | 4/1968 | Demler | 285/236 X |
| 3,402,946 | 9/1968 | Dedian | 285/236 |

FOREIGN PATENT DOCUMENTS

| 522,902 | 10/1953 | Belgium | 285/236 |
|---|---|---|---|
| 908,479 | 9/1945 | France | 285/179 |

Primary Examiner—Thomas F. Callaghan
Attorney, Agent, or Firm—Harvey C. Nienow

[57] ABSTRACT

A pipe fitting formed of resilient material having two or more end portions disposed at a predetermined angle to each other. A firm metallic sleeve is positioned about the resilient plastic material and a clamp is afforded at each of the end portions. Each such end portion is adapted to receive the end of a threaded or unthreaded pipe and is formed with internal annular ribs for sealingly engaging the pipe. The central portion of the fitting is provided with a thicker wall section so that the internal diameter thereat substantially coincides with or equals the internal diameter of the pipe.

3 Claims, 5 Drawing Figures

PIPE FITTING

The present invention relates generally to pipe fittings, and more particularly to pipe fittings which can be easily and quickly connected to or disconnected from standard pipes.

In forming pipe lines, it is desirable to have pipe fittings which can be quickly and easily attached to the adjoining pipes, and which can withstand the necessary internal pressure. Heretofore, pipe fittings have been made of cast iron, and as such, have been very unwieldy and difficult to install. Such prior cast iron fittings have utilized mechanical threads, and it has been found that such threads are difficult to connect, particularly for long sections of pipe.

Certain prior attempts have been made to provide flexible pipe fittings, but these have been so constructed as to be incapable of preventing leaks and withstanding even moderate pressures.

The present invention has as one of its objects, to provide a pipe fitting which is inherently flexible so as to readily compensate for slight irregularities or misalignment in the construction or placement of pipes to which it is to be attached.

Another object of the present invention is to provide a pipe fitting as characterized above which can be quickly and easily attached to existing pipes.

A further object of the present invention is to provide a pipe fitting as characterized above which will not deteriorate, but which can withstand corrosive or high temperature atmospheres.

A still further object of the present invention is to provide a pipe fitting as characterized above having sealing means whereby leakage is prevented.

An even further object of the present invention is to provide a pipe fitting as characterized above which includes positioning means to insure that the fitting is properly positioned relative to the pipes to which it is connected.

An even still further object of the present invention is to provide a pipe fitting as characterized above which is simple and inexpensive to manufacture and which is rugged and dependable in operation.

The novel features which we consider characteristic of our invention are set forth with particularity in the appended claims. The invention itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
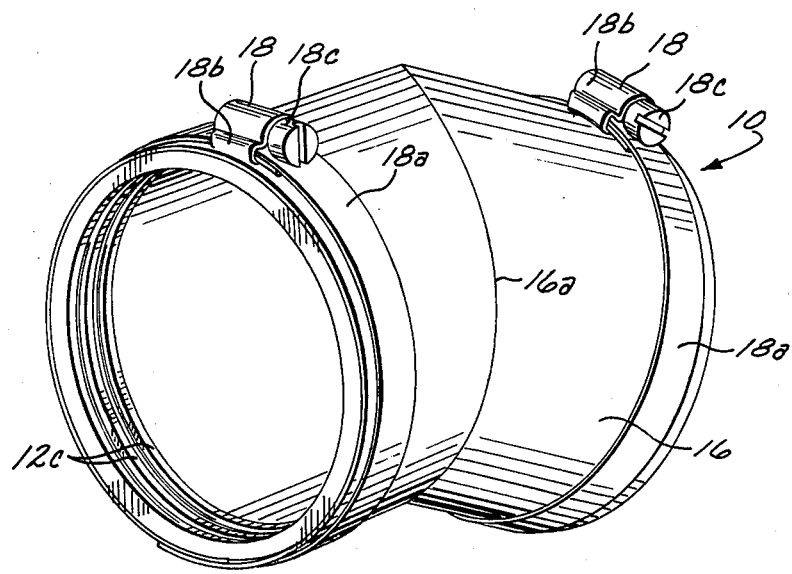
FIG. 1 is a perspective view of a pipe fitting according to the present invention.
Figure 2:
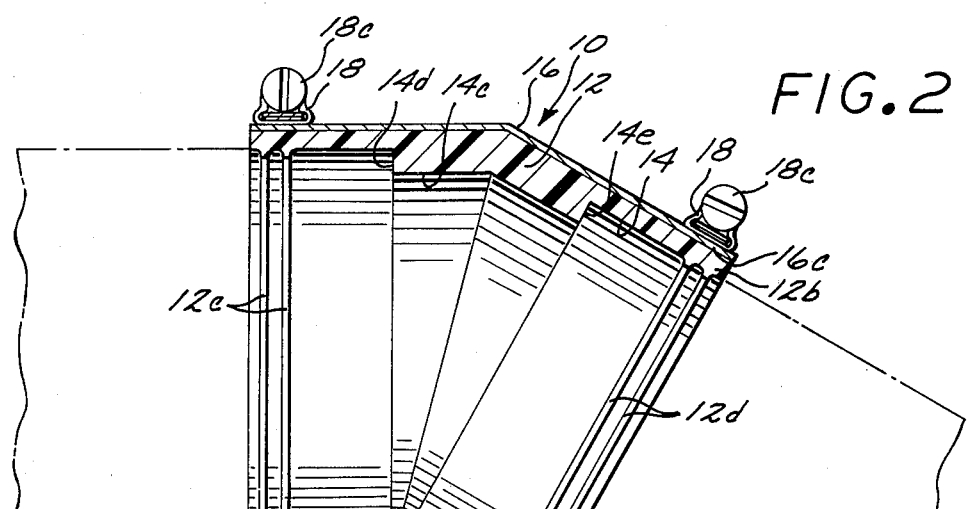
FIG. 2 is a longitudinal sectional view of the pipe fitting of FIG. 1.
Figure 3:
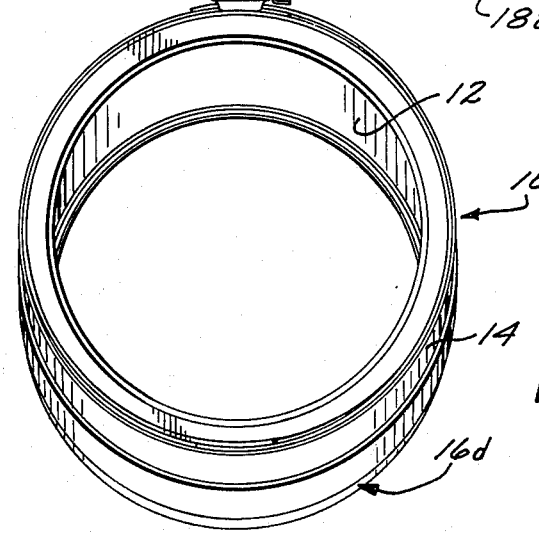
FIG. 3 is an end view of such pipe fitting.

Referring to FIG. 1 of the drawings, there is shown therein a pipe fitting 10 according to the present invention. As shown most particularly in FIG. 2 of the drawings, such pipe fitting comprises a resilient member 12 formed of plastic, rubber or other suitable resilient material which is impervious to certain high temperatures and to certain chemical environments. Such resilient member 12 is formed by molding and is generally cylindrical in construction with opposite end portions 12a and 12b disposed at an angle to each other to provide the fitting configuration.

Resilient member 12 is formed with a through opening 14 which, at the end portions 12a and 12b, is formed with an enlarged internal diameter as shown respectively at 14a and 14b. The central portion 14c of opening 14 is formed with a reduced diameter and is angularly offset as shown most clearly in FIG. 2. This latter feature, of course, provides the angular disposition of the end portions, as above mentioned.

Each of the opposite ends of resilient member 12 is formed with one or more annular internal ribs as shown at 12c and 12d. Such ribs, as will hereinafter be explained in greater detail, are operable to firmly seal the fitting 10 to the adjacent pipe ends.

Figure 5:
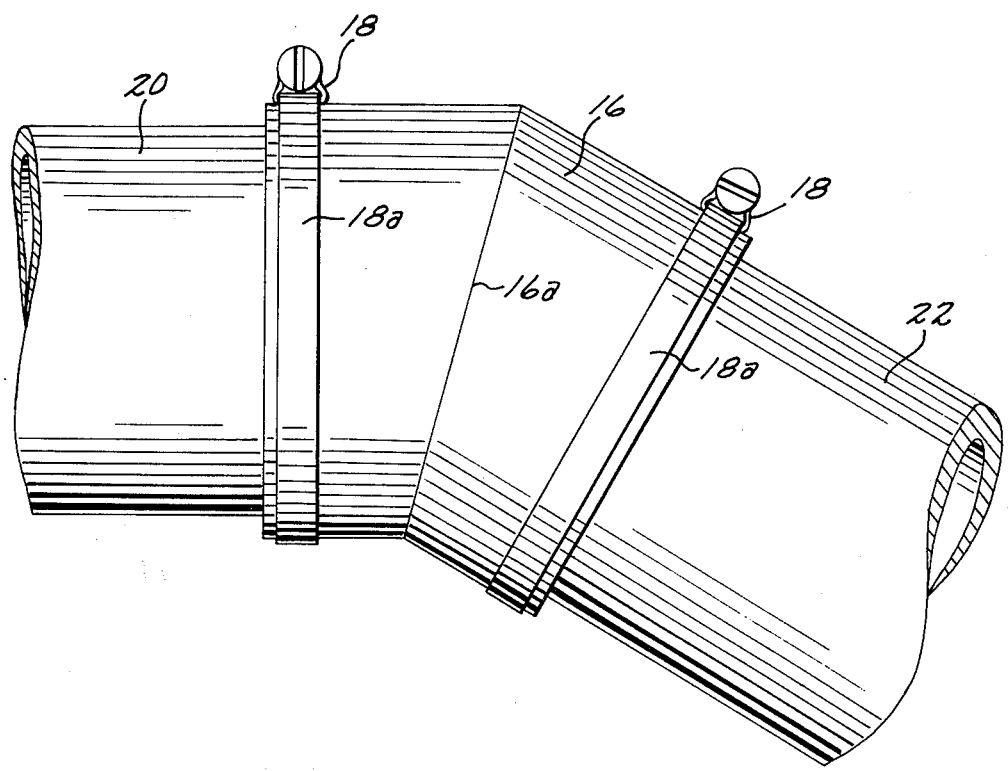
FIG. 5 is a fragmentary side elevational view of the pipe fitting and pipes of FIG. 4.

Mounted on and about the resilient member 12 is a sleeve 16 formed of any appropriate sheet material which has the proper tensile strength and deformability as will hereinafter become apparent. It has been found that sleeve 16 can be made of stainless steel to provide the desired strength and also to provide an exterior surface which is impervious to certain chemicals. Sleeve 16 may be formed in two cylindrical portions which are secured to each other along the line 16a as identified in FIGS. 1 and 5 of the drawings.

End portions 16b and 16c of sleeve 16 extend over the aforedescribed sealing ribs 12c and 12d of the end portions 12a and 12b of resilient member 12. At each such location, a circumferential clamping device 18 is provided. It may take substantially any desired form, but is shown in the drawings as comprising a strap 18a one end of which is secured to a fastening member 18b, the latter of which rotatably carries a threaded bolt or stud 18c. The strap 18a is formed with spaced grooves or slots to be engaged by the mechanical thread of bolt 18c, whereby rotation of such bolt causes one end of strap 18a to move relative to fastening member 18b so as to vary the size or circumference of the corresponding end portion of sleeve 16.

To enable the opposite ends 16b and 16c of sleeve 16 to be constricted about the resilient member 12, it has been found desirable to form such sleeve with overlapping side wall end portions as shown at 16d. This permits such end portions to move relative to each other as the clamping devices 18 are tightened.

Figure 4:
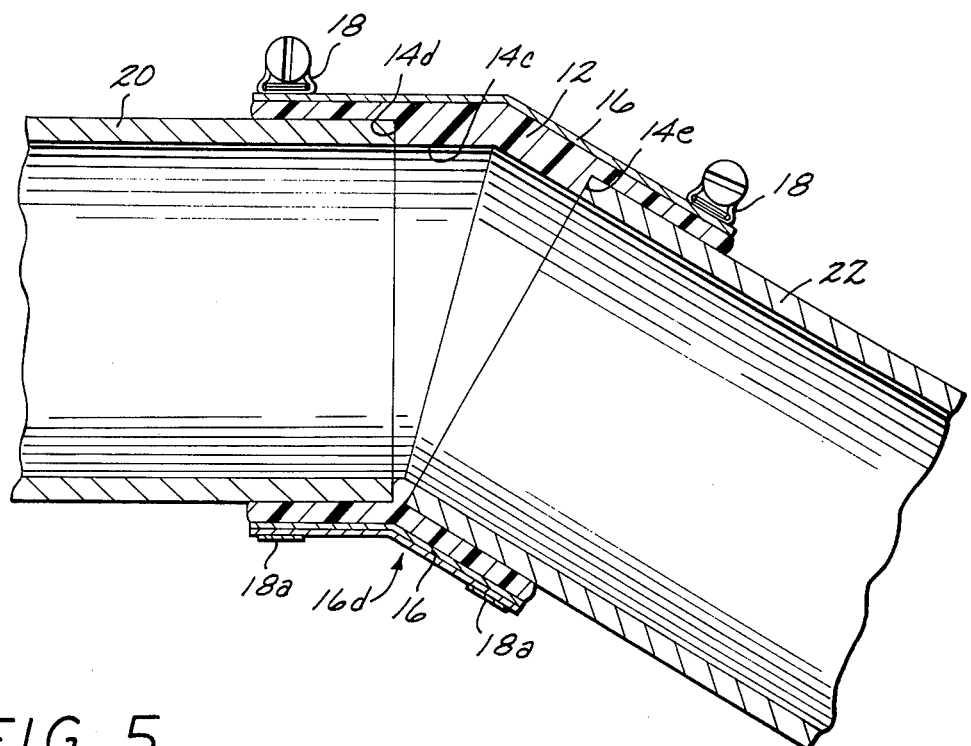
FIG. 4 is a fragmentary longitudinal sectional view showing the subject fitting attached to the end portions of several pipes.

As shown most particularly in FIG. 4 of the drawings, the subject pipe fitting is utilized by inserting the end portions of several pipes 20 and 22 into the end portions 12a and 12b. The end surfaces of such pipes are caused to bottom against the annular shoulders 14d and 14e formed between the reduced diameter section 14c and the enlarged diameter sections 14a and 14b.

With the pipes 20 and 22 so positioned, the clamps 18 at the opposite ends of the fitting 10 are firmly clamped about the sleeve 16 and the resilient member 12. This causes the internal annular ribs 12c and 12d of resilient member 12 to firmly and sealingly grip the end portions of the respective pipes.

When it is desired to remove the pipe fitting 10 from the pipes 20 and 22, it is a simple matter to reverse the above procedure of clamping devices 18 and to remove the fitting from the pipes.

Substantially any type or kind of pipes 20 and 22 may be employed with the pipe fitting 10. The end portions thereof may be formed with or without fastening threads. In any event, the subject pipe fitting 10 is caused to firmly and sealingly clamp the pipe end portions.

The internal diameter of the section 14c of the through opening 14, as shown most particularly in FIG. 4 of the drawings, coincides with the internal diameter of the pipes 20 and 22 to provide a contiguous through opening therewith. Thus, the flow from one pipe to the other through the pipe fitting 10 is unobstructed.

Although we have shown and described certain specific embodiments of our invention, we are well aware that many modifications thereof are possible. For instance, the subject invention may be applied to a Y pipe, a T pipe, and combinations thereof. The invention, therefore, is not to be restricted except insofar as is necessitated by the prior art and by the appended claims.

We claim:
1. A pipe fitting comprising in combination:
    a rigid sheet metal sleeve formed from two angularly disposed cylindrical portions the inner peripheral edges of which intersect and are joined along a common plane disposed transverse and at an angle to both cylindrical portions,
    both longitudinal axes of the cylindrical portions lying in a single plane which is perpendicular to the common plane,
    the adjacent cylindrical portions disposed in the single plane meeting at an obtuse angle which is bisected by the common plane,
    a thick-walled annular resilient member disposed within and lining the sheet metal sleeve,
    the end portions of the resilient member having an annular enlarged internal diameter section for receiving the ends of pipes,
    the enlarged internal diameter sections extending inwardly such that a thickened central V-shaped section is left in the central section of the resilient member as viewed in the single plane, the angle included in the V-shaped section being the supplement of the obtuse angle,
    the inner surface of the central V-shaped section being dimensioned to be in line with the internal surfaces of the two pipes to be received in the annular enlarged internal diameter sections so as to provide smooth uninterrupted liquid flow,
    the sheet metal sleeve is split and the edges substantially overlap each other to provide for circumferential dimensional adjustment, and
    clamping means comprising a circumferential clamp adjacent each free end of the sheet metal sleeve to provide firm gripping of the ends of the pipes which are inserted within the annular enlarged internal diameter sections of the thick-walled annular resilient member.
2. The pipe fitting as set forth in claim 1.
    wherein each of the annular enlarged internal diameter sections of the resilient member end portions has at least one circumferential resilient rib which extends inwardly to provide a firm seal against said pipe ends.
3. The pipe fitting as set forth in claim 1.
    wherein said sheet metal sleeve is formed of stainless steel shaped complementally of the exterior of said annular resilient member.

* * * * *